(12) United States Patent
Kopp et al.

(10) Patent No.: US 12,034,173 B2
(45) Date of Patent: Jul. 9, 2024

(54) HOUSING ELEMENT OF A BATTERY, METHOD FOR PRODUCTION AND USE OF SUCH A HOUSING ELEMENT

(71) Applicant: Robert Bosch GmbH, Stuttgart (DE)

(72) Inventors: Benjamin Kopp, Remseck Am Neckar (DE); Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 17/682,302

(22) Filed: Feb. 28, 2022

(65) Prior Publication Data

US 2022/0278408 A1     Sep. 1, 2022

(30) Foreign Application Priority Data

Mar. 1, 2021    (DE) ..................... 10 2021 201 922.6

(51) Int. Cl.
*H01M 50/213*    (2021.01)
*H01M 10/6567*    (2014.01)

(52) U.S. Cl.
CPC ..... *H01M 50/213* (2021.01); *H01M 10/6567* (2015.04)

(58) Field of Classification Search
None
See application file for complete search history.

(56) References Cited

U.S. PATENT DOCUMENTS

| | | |
|---|---|---|
| 2017/0179551 A1 | 6/2017 | Shepard et al. |
| 2019/0237827 A1 | 8/2019 | Ge et al. |
| 2020/0136213 A1* | 4/2020 | Geskes ............... H01M 50/249 |
| 2020/0328483 A1* | 10/2020 | Kopp .................. H01M 10/613 |
| 2021/0083247 A1* | 3/2021 | Schmitt .................. B60L 50/64 |
| 2021/0111459 A1* | 4/2021 | Tang ................... H01M 50/249 |
| 2021/0288372 A1* | 9/2021 | Kim .................... H01M 50/204 |
| 2022/0021068 A1* | 1/2022 | Zeng .................. H01M 10/613 |
| 2022/0247029 A1* | 8/2022 | Takahashi ........... H01M 10/441 |
| 2023/0420769 A1* | 12/2023 | Jeon ..................... H01M 50/24 |

FOREIGN PATENT DOCUMENTS

| | | |
|---|---|---|
| DE | 102018104935 A1 | 9/2019 |
| DE | 102019205388 A1 | 10/2020 |
| DE | 102019214199 A1 | 3/2021 |
| DE | 102019215338 A1 | 4/2021 |
| DE | 102021200040 A1 | 7/2022 |
| JP | 2015167069 A | 9/2015 |

* cited by examiner

*Primary Examiner* — Scott J. Chmielecki
(74) *Attorney, Agent, or Firm* — Michael Best & Friedrich LLP

(57) ABSTRACT

A housing element of a battery is disclosed, wherein the housing element (1) is designed to be connected to a further housing element so as to form a common interior space designed for receiving a plurality of battery cells of a battery module, wherein the housing element (1) forms a temperature-control structure (2) on a first side (10) and a covering element (3) is connected to the housing element (1) in such a way that the covering element (3) delimits a flow duct (4), through which temperature-control fluid can flow, in a fluid-tight manner and the temperature-control structure (2) is designed such that the temperature-control fluid can flow around it, wherein furthermore a first element (5) of a battery controller is arranged on the covering element (3) in a thermally conductive manner.

20 Claims, 3 Drawing Sheets

HOUSING ELEMENT OF A BATTERY, METHOD FOR PRODUCTION AND USE OF SUCH A HOUSING ELEMENT

BACKGROUND

The invention proceeds from a housing element of a battery according to the preamble of the independent claim. Furthermore, the invention also relates to the production of such a battery and to the use of such a battery.

It is known from the prior art that a battery module has a plurality of individual battery cells which each have a positive voltage terminal and a negative voltage terminal, wherein, for electrically conductively connecting the plurality of battery cells to one another in series and/or in parallel, the respective voltage terminals are electrically conductively connected to one another and can thus be interconnected to form the battery module. Battery modules are, in turn, interconnected to form batteries or to form battery systems.

Owing to a large number of possible different vehicle installation spaces, variable module sizes are sought in order to be able to optimally utilize the available installation space.

Furthermore, the battery cells of a battery module, for example lithium-ion battery cells or lithium-polymer battery cells, heat up during operation, as a result of chemical reaction processes, owing to their electrical resistance during output of power or intake of power. Particularly in the case of relatively fast output of power or intake of power, these processes are comparably pronounced. The more powerful a battery or a battery module is, the more pronounced is the heating that occurs, and, in association with this, the more pronounced are the requirements for an efficient temperature-control system. In order to increase the safety of a battery module and also ensure the performance of the battery cells, the battery cells of a battery module have to be both heated and cooled in order to be able to operate these as far as possible in a particular temperature range, so that, for example, increased aging behavior or decomposition of the cell chemistry can be prevented. However, the battery cells predominantly have to be cooled.

For example, a temperature-control arrangement, that is to say a heating arrangement or cooling arrangement, of the battery may be formed by a liquid-type temperature-control arrangement with a water/glycol mixture. Here, this mixture is guided through cooling plates arranged under the battery module. The cooling plate may be connected to a corresponding component of a cooling circuit here.

Prior art documents include, for example, documents DE 10 2021 200 040 and DE 10 2019 214 199 which had not yet been published as of the application date of the priority application.

SUMMARY

A housing element of a battery having the features of the independent claim offers the advantage that temperature control of individual components of the battery can be adapted to the respective needs of said individual components. In particular, the requirements in respect of temperature control of a plurality of battery cells and power-electronics components can be adapted and optimized separately from one another. Therefore, optimization of temperature control or cooling of the plurality of battery cells is possible separately from optimization of temperature control or cooling of the power-electronics components. In particular, the pressure loss can also be optimized in a reliable manner as a result.

To this end, the invention provides a housing element of a battery. Here, the housing element is designed to be connected to a further housing element so as to form a common interior space designed for receiving a plurality of battery cells of a battery module.

In this case, the housing element forms a temperature-control structure on a first side. Furthermore, a covering element is connected to the housing element in such a way that the covering element delimits a flow duct, through which temperature-control fluid can flow, in a fluid-tight manner. The temperature-control structure is designed such that the temperature-control fluid can flow around it here.

Furthermore, a first element of a battery controller is arranged on the covering element in a thermally conductive manner.

Advantageous developments of and improvements to the device specified in the independent claim are possible by means of the measures set out in the dependent claims.

In particular, one embodiment according to the invention of the housing element of the battery offers the advantage that efficient cooling of the individual components, for example the plurality of battery cells and the power-electronics components for example, is possible because relatively short thermal paths are formed. At the same time, a compact design of a battery can be provided.

The covering element can be connected to the housing element by means of friction stir welding, for example.

Overall, the temperature of the first element of the battery controller can be controlled in a reliable manner. In particular, the temperature of the first element of the battery controller can be controlled independently of the plurality of battery cells here. Temperature control of the first element of the battery controller can be influenced by means of the design of the temperature-control structure here.

A temperature-control fluid is intended to be understood to mean a medium, for example a mixture of water and glycol for example, which can absorb or give off a quantity of thermal energy and accordingly cool or heat a surrounding area. For example, a coolant used for operating a vehicle may be used as a temperature-control fluid.

It is expedient when the temperature-control structure is designed in such a way that a flow-guiding element rises from the first side. This flow-guiding element delimits a flow duct for guiding the temperature-control fluid. Furthermore, a large number of vortex elements rise in the flow duct here. Said vortex elements are arranged in such a way that a turbulent flow of temperature-control fluid flowing in the flow duct is created. In particular, the flow-guiding element is designed with a greater height than the respective vortex elements. Therefore, the covering plate can be arranged on the flow-guiding element at a distance from the vortex elements.

In comparison to a laminar flow, a turbulent flow has the advantage that heat transfer is significantly increased. Laminar flows are parallel laminar flows of the fluid without significant heat exchange perpendicularly to the layers or in duct height on account of a lack of mixing between the layers. Owing to an increase in turbulence when a change-over is made from laminar flow to turbulent flow, the heat transfer can be considerably increased given a comparable pressure loss.

The flow-guiding element may, for example, border the first side, that is to say may be fitted to an outer edge of the housing element on the first side and serves, in particular, to provide support against an internal pressure applied during operation of the temperature-control device, that is to say an increased pressure in comparison to the ambient pressure which may be present in the flow duct during operation.

A vortex element is intended to be understood to mean a geometric structure which converts a laminar flow of temperature-control fluid into a turbulent flow, at least in regions. For this purpose, a vortex element may be configured, for example, cylindrically, conically, pyramidally or with any other geometric shape. In particular, different vortex elements of different geometric shapes can together form a pattern of vortex elements which creates a particularly high proportion of turbulent flows in a volume flow of temperature-control fluid. The vortex elements provided in the flow duct result in thorough mixing of temperature-control fluid flowing in the flow duct, so that an interface, which forms contact between the temperature-control fluid and the housing element, is always swirled up. Furthermore, in this way, firstly the flow can be deflected in a more targeted manner and secondly the heat-transmitting surface area can be significantly increased in size. Advantageously, the vortex elements are not connected to the covering element.

In order to minimize a loss of pressure with which a temperature-control fluid flows through the flow duct, the flow-guiding element is designed, in particular, with a greater height than respective vortex elements or respective vortex elements are designed with a lower height than the flow-guiding element, so that a covering element intended to be arranged on the flow-guiding element can be arranged at a distance from the vortex elements. Owing to the vortex elements lower than the flow-guiding element, a flow region is formed between the covering element and the vortex elements, it being possible for the temperature-control fluid to flow in said flow region without obstruction. On account of flow components introduced into the temperature-control fluid by the vortex elements, temperature-control fluid flowing in the flow duct is necessarily thoroughly mixed with temperature-control fluid flowing between the vortex elements, so that there is a reduction in pressure in the volume flow overall, but a constant interface to the housing element and/or the covering element is avoided.

Furthermore, it may be provided that the flow-guiding element comprises an intermediate element which divides the flow duct into two component ducts which are connected in a flow-guiding manner only at one end of the flow duct, wherein an inlet is contained in a first component duct and an outlet is contained in a second component duct.

Owing to an intermediate element which divides, for example, the flow duct into two halves, in particular into two symmetrical halves, a more complex flow path can be produced and a direct or shortest possible flow movement from the inlet to the outlet can be prevented (bypass flow). Accordingly, the intermediate element then maximizes a surface area of the flow duct and establishes a correspondingly maximized transfer of thermal energy between the housing element and the temperature-control fluid.

In particular, a flow with a U-shaped profile can be achieved in this way. Here, the inlet and the outlet can furthermore be arranged adjacent to one another, wherein, for example, the intermediate element can prevent a bypass flow between the inlet and the outlet. For this purpose, the intermediate element can be connected to the covering element, in particular in a cohesive manner, for example by means of friction stir welding, and in particular additionally to the flow-guiding element.

In particular, the intermediate element can therefore be connected to the covering element, so that a bypass flow or a shortest possible connection between an inlet and an outlet for the temperature-control fluid is prevented and the temperature-control fluid is guided along the flow duct.

The width and length of the flow duct are critically also determined by the intermediate element. It can be provided that the intermediate element has a width of between 8 mm and 12 mm. Experiments have surprisingly shown that an intermediate element with a width of between 8 mm and 12 mm, in particular of 11 mm, leads to a particularly efficient exchange of thermal energy between the housing element and the respective temperature-control fluid and reliably prevents arching of the covering element due to the internal pressure during operation. Owing to the cohesive connection between the intermediate element and the covering element, the stresses generated by the internal pressure in the circumferential connecting point between flow-guiding elements and the covering element during operation can be reduced to stresses that can be withstood to achieve the required service life.

Furthermore, it can be provided that further vortex elements are fitted on flanks of the intermediate element and/or on flanks of the flow-guiding element. Further vortex elements formed on respective flanks, that is to say on respective side parts of the intermediate element or on an inner side of the flow-guiding element, can prevent a continuous interface of the temperature-control fluid at the intermediate element or at the flow-guiding element. As a result, the volume flow of the temperature-control fluid into these regions can be reduced.

By way of vortex elements formed on respective flanks of the intermediate element or the flow-guiding element, temperature-control fluid flowing along the intermediate element or the flow-guiding element is converted into a turbulent flow and mixed with further portions of the temperature-control fluid, so that a homogeneous heat distribution is achieved within the temperature-control fluid. This additionally prevents a large portion of the temperature-control fluid flowing through between the flow-guiding element and vortex elements without obstruction and therefore not contributing to heat transfer. The uniform flow distribution minimizes the pressure loss, equalizes the heat transfer and contributes to homogeneous and improved ventilation.

Furthermore, it can be provided that the vortex elements are fitted in a pattern which comprises a large number of rows.

In this case, vortex elements of respectively adjacent rows are arranged at a distance of between 8.5 mm and 12.5 mm from one another and/or symmetrically offset with respect to one another.

Symmetrically offset rows of vortex elements result in particularly efficient conversion of laminar flows into turbulent flows or thorough mixing of turbulent flows with one another and, as a result of this, particularly homogeneous temperature distribution within a respective volume flow of temperature-control fluid.

Experiments have surprisingly shown that an offset of respective rows of the vortex elements of between 8.5 mm and 12.5 mm, in particular of 10.5 mm, leads to particularly efficient exchange of thermal energy between the housing element and a respective temperature-control fluid. The distance is measured between respective center points of the vortex elements here.

Furthermore, it can be provided that the vortex elements are of circular design and have a diameter of between 3 mm and 6 mm, in particular 4.26 mm, and/or a height of between 11.5 mm and 14.5 mm, in particular 13 mm, and/or a draft angle of at least 8 degrees and/or a radius of at least 1.5 mm.

Experiments have surprisingly shown that circular, in particular cylindrical, vortex elements with a diameter of between 3 mm and 6 mm and/or a height of between 11.5 mm and 14.5 mm and/or a draft angle of at least 8 degrees and/or a radius of at least 1.5 mm lead to particularly efficient exchange of thermal energy between the housing element and a respective temperature-control fluid.

Overall, the total duct height is also dependent on the height of the vortex elements and, for example, should be chosen such that a minimum distance between vortex elements and the covering element of 0.5 mm is formed.

Given a preferred height of the vortex elements of 13.0 mm, a duct height of, for example, 13.5 mm is preferred.

By way of comparably higher vortex elements, in particular in comparison to other known embodiments or else when comparing the height to the diameter, a comparably large amount of heat can be dissipated owing to an increase in the heat-transmitting surface area given a pressure loss which is as low as possible.

Furthermore, it is expedient when a second element of the battery controller is arranged in a thermally conductive manner on a second side, opposite the first side, of the housing element. As a result, the temperature of the second element of the battery controller can likewise be reliably controlled. In particular, the temperature of the second element of the battery controller can be controlled independently of the plurality of battery cells.

It is advantageous when the first element of the battery controller comprises at least one electrical component of the battery module and/or at least one electronic component of the battery module.

In particular, a thermal compensation element, for example a thermally conductive adhesive or what is known as a thermal interface material (TIM), for example a gap pad or gap filler, can be arranged between the first element of the battery controller, for example the electrical component and/or the electronic component, and the covering element.

A reliable thermal line can be formed, for example, by connecting a printed circuit board comprising the electronic component to the covering element, for example also by means of screwing or by means of a cohesive connection. Overall, this results in a comparably short thermal path between a temperature-control fluid flowing through the flow duct and the printed circuit board with a consequently comparably low thermal resistance.

It is advantageous here when the electrical component of the battery module is a cell connector and/or a line. Here, cell connectors are designed to electrically conductively connect voltage terminals of the plurality of battery cells to one another in series and/or in parallel. Lines are designed to conduct electric current from one component to another component.

It is preferred when the electronic component of the battery module is a switch, a fuse element, a battery controller system and/or a resistor. Owing to the arrangement of the electrical component and/or the electronic component on the first side, it is possible to electrically conductively interconnect a plurality of battery cells of the battery module to one another in series and/or in parallel and to implement open-loop control and closed-loop control on a battery module. Furthermore, the temperature of these components can be controlled in a reliable manner at the same time.

According to a preferred aspect of the invention, the at least one electronic component is integrated into a printed circuit board here. Furthermore, the line can also be at least partially integrated into the printed circuit board. This offers the advantage of a comparably compact design, the temperature of which can furthermore likewise be controlled in a simple manner.

It is further expedient when the second element of the battery controller is an electrical voltage converter, in particular a DC-DC voltage converter. Furthermore, the electrical voltage converter or the DC-DC voltage converter can be arranged on a further printed circuit board or be integrated into a further printed circuit board.

Here, furthermore, a thermal compensation material, for example a thermally conductive adhesive, what is known as a gap filler or what is known as a thermal interface material (TIM), for example a gap pad or a gap filler, can be arranged between the second element of the battery controller, for example the electrical voltage converter or the DC-DC voltage converter, and the second side of the housing element.

A reliable, thermal line can be formed by connecting, for example by means of screwing, the electrical voltage converter to the housing element. Overall, this results in a comparably short thermal path between a temperature-control fluid flowing through the flow duct of the housing element and the electrical voltage converter or the DC-DC voltage converter with a consequently comparably low thermal resistance.

It is particularly preferred when the covering element is designed in a planar manner and from a metal material or when the covering element has a deformed portion for receiving the first element of the battery controller. In particular, the covering element can preferably be formed from a metal sheet here.

In this case, the covering element can be connected to the housing element, for example, in a cohesive manner, in particular in a welded manner. For this purpose, the housing element can have, for example, a connecting region which is designed to be cohesively connected to the covering element. At this point, it should once again be noted that the covering element seals off the flow duct in a fluid-tight manner. In particular, such a seal can be formed by cohesively connecting the covering element to the housing element.

Furthermore, it is also possible for the covering element to be able to be connected to the housing element, for example, in an interlocking manner, in particular in a screwed manner. For the purpose of reliable sealing off, a sealing element can furthermore be arranged between the covering element and the housing element here.

A planar design of the covering element offers the advantage that a thermal contact area which is comparably as large as possible is formed for connecting the first element of the battery controller.

A covering element with a deformed portion for receiving the first element of the battery controller offers the advantage, for example, that a height of the flow duct, through which height temperature-control fluid can flow, can be correspondingly adapted, as a result of which a design optimized particularly in respect of installation space can be provided. Furthermore, reliable receiving of the first element of the battery controller by the deformed portion can be provided. Furthermore, it should be noted that the covering element is formed from a metal material, and the metal material can be selected here from amongst aluminum, copper or nickel. This offers the advantage of a comparatively high thermal conductivity.

In particular, a thermal compensation element, for example a thermally conductive adhesive, can be arranged between the first element of the battery controller and the covering element here.

It is expedient when the housing element is designed as a die-cast housing, in particular is of one-piece design. As a result, a mechanically comparably stable design can be provided. In addition, it is possible as a result for regions conducting temperature-control fluid to be able to be formed within the die-cast components, so that additional cooling plates, heating elements or temperature-control systems can be dispensed with.

For example, the vortex elements, the intermediate element and the flow-guiding element can be formed during the die-casting process.

Furthermore, it can be provided that the flow duct comprises at least one clear region in which no vortex elements are arranged, wherein the at least one clear region is preferably situated outside a coupling region at which the covering plate is thermally coupled to the first element of the battery controller. By way of a clear region of the flow duct, in which clear region no vortex elements are arranged, that is to say which clear region is free of vortex elements, the pressure loss in a feed line for feeding temperature-control fluid can be minimized. Furthermore, a clear region causes rapid distribution of temperature-control fluid through the flow duct and, as a result, particularly good ventilation even without vacuum filling. Accordingly, a temperature-control fluid can flow into the flow duct by simply being filled, for example from a bottle or a tank, using a clear region, without a pump device having to be connected.

The present invention also relates to a production method for producing a housing element according to the invention.

The production method comprises:

a) providing a housing element,
which forms a temperature-control structure on a first side, and
b) connecting a covering element to the housing element in such a way
that the covering element delimits a flow duct, through which temperature-control fluid can flow, in a fluid-tight manner and
the temperature-control structure is designed such that the temperature-control fluid can flow around it,
characterized in that
c) arranging a first element of a battery controller on the covering element in a thermally conductive manner.

The temperature-control structure is further designed in such a way that a flow-guiding element, which delimits a flow duct for guiding the temperature-control fluid, rises from the first side. In this case, furthermore, a large number of vortex elements rise in the flow duct, wherein the flow-guiding element is cohesively connected to the covering element in a fluid-tight manner.

The invention further also relates to the use of a housing element according to the invention in a battery.

BRIEF DESCRIPTION OF THE DRAWINGS

Exemplary embodiments of the invention are illustrated in the drawings and explained in more detail in the following description.

In the drawings.

DETAILED DESCRIPTION

Figure 1:
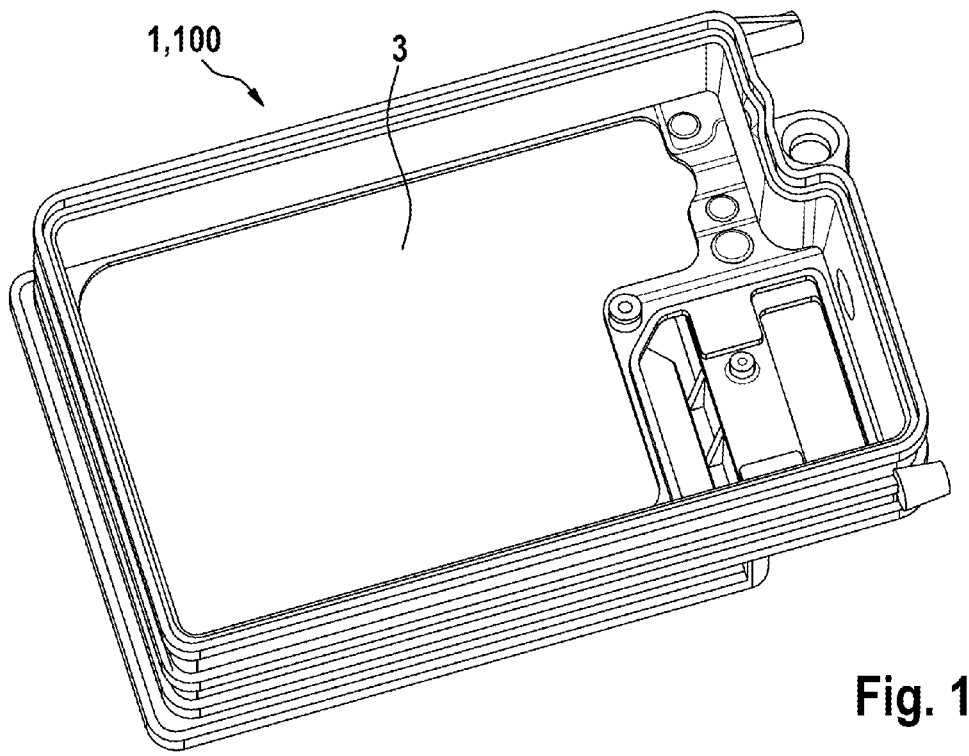
FIG. 1 shows a perspective view of one embodiment of a housing element according to the invention of a battery.

FIG. 1 shows an embodiment of a housing element 1 according to the invention of a battery.

In this case, the housing element 1 of the battery is designed to be connected to a further housing element, not shown in FIG. 1. Here, an interior space, which is designed to receive a plurality of battery cells of a battery module, may be formed jointly.

In this case, the housing element 1 is preferably designed as a die-cast housing 100. In particular, the die-cast housing 100 is of one-piece design.

In this case, FIG. 1 shows a covering element 3, which is connected to the housing element 1. Here, this connection is designed in such a way that the covering element 3 delimits a flow duct 4, which is described in conjunction with FIG. 2, in a fluid-tight manner. Furthermore, the flow duct 4 is designed for temperature-control fluid to be able to flow through it.

In this case, the covering element 3 may be designed, for example, in a planar manner from a metal.

Furthermore, a first element 5, not shown in FIG. 1, of a battery controller is arranged on the covering element 3 in a thermally conductive manner.

In this case, the first element 5 of the battery controller may comprise, for example, at least one electrical component 80 of the battery module and/or at least one electronic component 81 of the battery module.

The electrical component 80 of the battery module may be, for example, a cell connector and/or an electrical line.

Here, the electronic component 81 of the battery module may be, for example, a switch, a fuse element, a battery controller system and/or a resistor and is integrated, in particular, into a printed circuit board.

In addition, a second element 50 of a battery controller may be arranged in a thermally conductive manner on the housing element 1 on a side 11 opposite the first side 10. In this case, the second element 50 of the battery controller may be an electrical voltage converter, in particular a DC-DC voltage converter.

Figure 2:
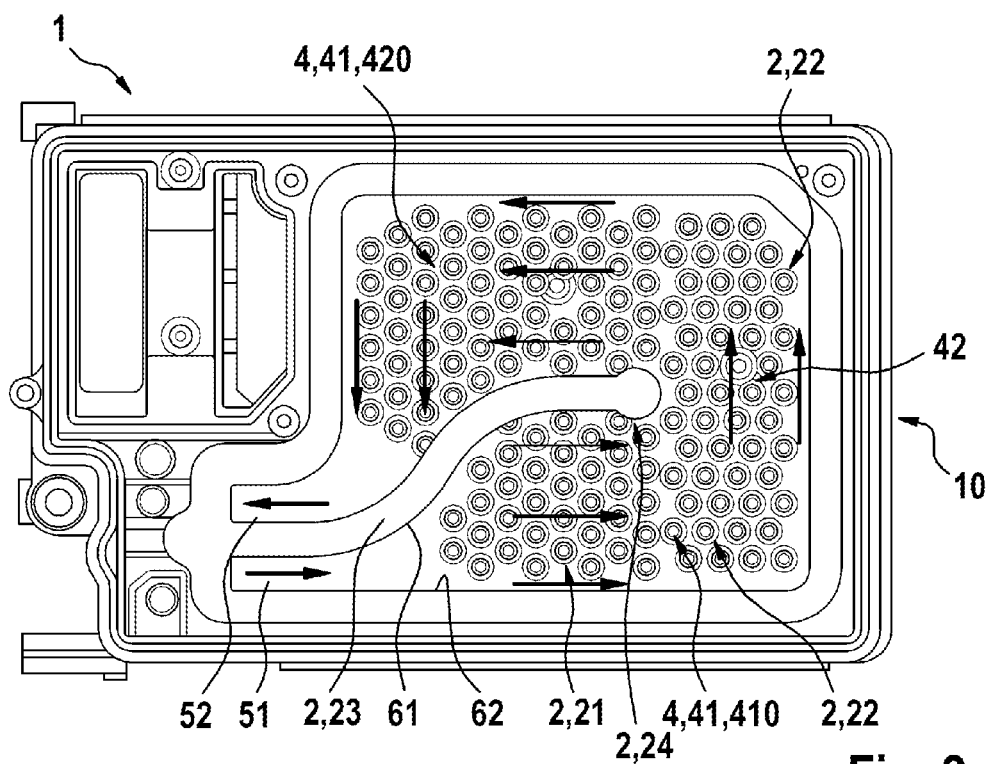
FIG. 2 shows a bottom view of the embodiment of a housing element according to the invention of a battery according to FIG. 1, without the arrangement of a covering element, FIG. 3 schematically shows a production method for connecting the covering element to a housing element.

FIG. 2 shows a bottom view of the embodiment of a housing element 1 according to the invention of a battery according to FIG. 1, without the arrangement of a covering element 3.

In particular, said figure shows a first side 10 of the housing element 1. According to FIG. 2, the first side 10 corresponds to the bottom side of the housing element 1.

Said figure shows that a temperature-control structure 2 is formed on the first side 10 of the housing element 1. After the connection, shown in FIG. 1, of the covering element 3 to the housing element 1, the flow duct 4 through which temperature-control fluid can flow is formed. Here, the temperature-control structure 2 is designed such that the temperature-control fluid can flow around it.

In this case, the temperature-control structure 2 is designed, in particular, in such a way that a flow-guiding element 21 rises from the first side 10. Here, the flow-guiding element 21 delimits the flow duct 4 for guiding the temperature-control fluid. Furthermore, a large number of vortex elements 22 rise from the first side 10 in the flow duct 4. Said vortex elements are arranged in such a way that a turbulent flow of temperature-control fluid flowing in the flow duct 4 is created.

Further vortex elements 24 are further fitted on flanks 61 of the intermediate element 23. In addition, vortex elements 24 can also be formed flanks 62 of the flow-guiding element 21.

In this case, the flow-guiding element 21 is designed, in particular, with a greater height than the respective vortex elements 22. Therefore, the covering plate 3 can be arranged on the flow-guiding element 21 at a distance from the vortex elements 22.

Furthermore, the flow-guiding element 21 comprises an intermediate element 23. Said intermediate element has, in particular, a width of between 8 mm and 12 mm.

The intermediate element 23 further divides the flow duct 4 into two component ducts 41. These two component ducts 41 are connected to one another in a flow-guiding manner only at one end 42.

Furthermore, said figure shows that the housing element 1 comprises an inlet 51 in a first component duct 410 and an outlet 52 in a second component duct 420. In this case, temperature-control fluid can flow into the flow duct 4 through the inlet 51 and temperature-control fluid can flow out of the flow duct 4 through the outlet 52.

By way of example, the depicted flow guidance of the temperature-control fluid in the flow duct 4 can be formed in this case.

Figure 3:
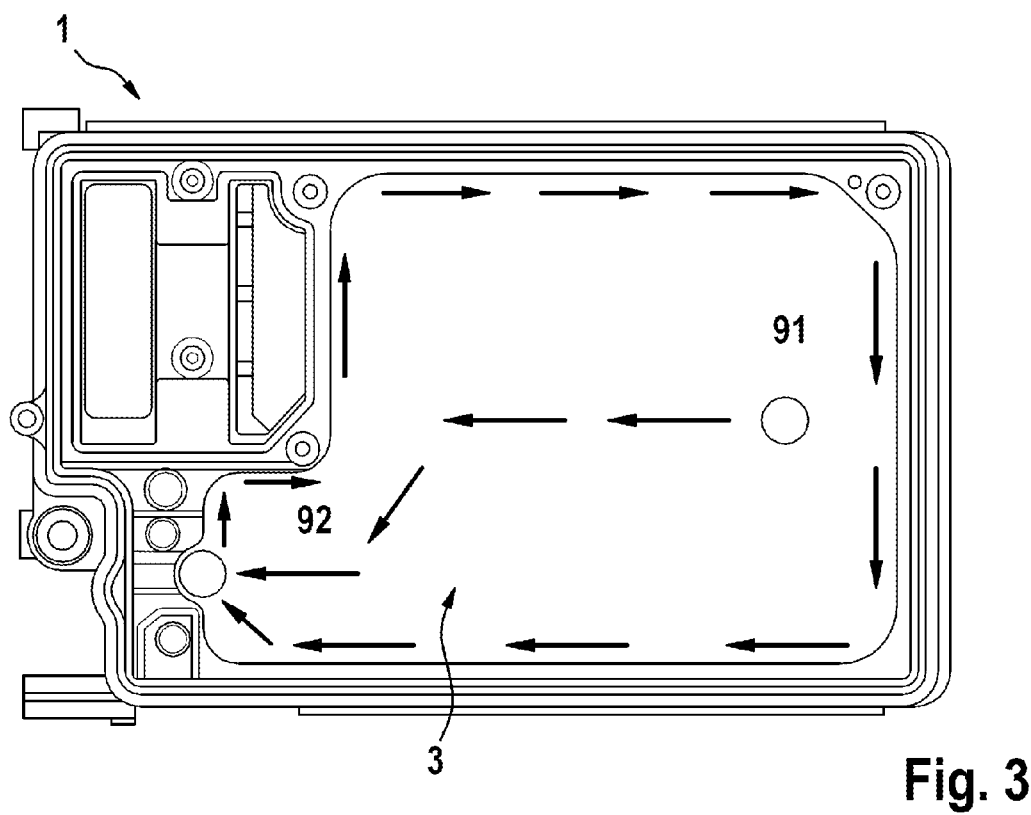

FIG. 3 schematically shows a production method for connecting a covering element 3 to a housing element 1. In this case, the connection is preferably formed in a cohesive manner, in particular by means of friction stir welding.

In this case, the start point 91 lies at one end of the intermediate element 23. Here, the welding process proceeds initially along the intermediate element 23, runs around the flow-guiding element 21 and ends at an end point 92. Here, the end point 92 is arranged in a region between the inlet 51 and the outlet 52. In principle, a hole is created at the exit point of the tool during friction stir welding. Since the flow duct 4 is loaded with an internal pressure by the temperature-control fluid, it is advantageous to place the end point 92 as the exit point of the friction stir welding tool in a region which is subject to less mechanical loading by the internal pressure.

Figure 4:
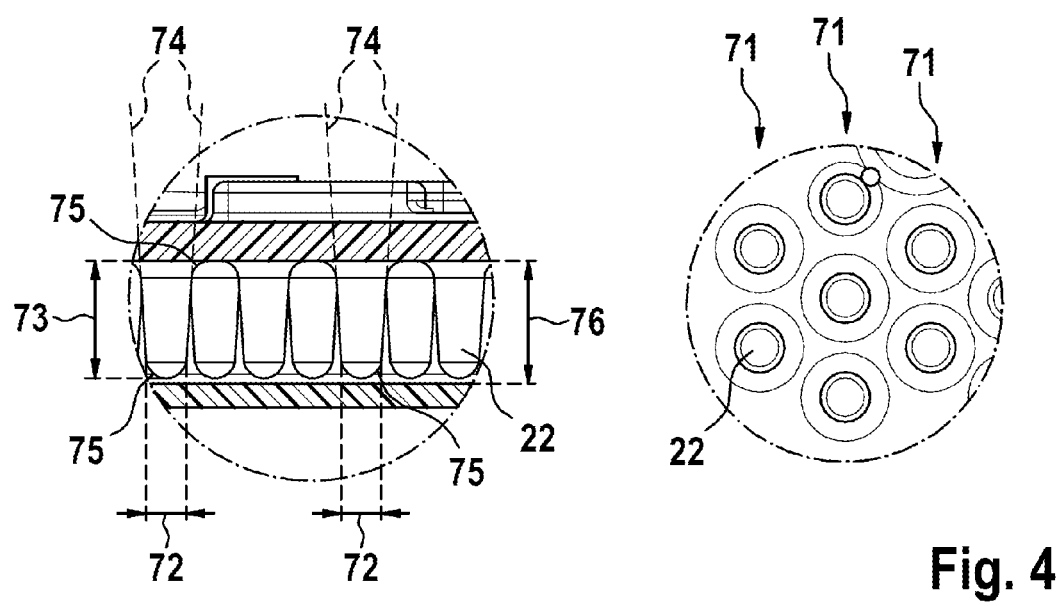
FIG. 4 shows illustrations of details of vortex elements.

FIG. 4 shows illustrations of details of vortex elements 22.

In the first instance, said figure shows that the vortex elements 22 are fitted in a pattern which comprises a large number of rows 71.

In this case, vortex elements 22 of respectively adjacent rows 71 are preferably at distances of between 8.5 mm and 12.5 mm. In particular, a distance of 10.5 mm between vortex elements 22 of adjacent rows 71 is particularly preferred.

Adjacent rows 71 are further respectively symmetrically offset in relation to one another.

Said figure further shows that the vortex elements 22 are of circular design. At this point, it should be noted that circular is intended to be understood to mean that the vortex elements 22 have a circular cross-sectional area. In this case, a diameter 72 of the vortex elements 22, in particular of the cross-sectional area of the vortex elements, is advantageously between 3 mm and 6 mm. A diameter 72 of 4.26 mm is particularly preferred.

In addition, the vortex elements 22 have a height 73 of preferably 11.5 mm to 14.5 mm. A height 73 of 13 mm is particularly preferred.

Furthermore, the vortex elements 22 have a draft angle 74 of at least 8 degrees. Furthermore, the vortex elements 22 have a radius 75 of at least 1.5 mm.

FIG. 4 further also shows a duct height 76, which is preferably 13.5 mm in this exemplary embodiment.

Figure 5:
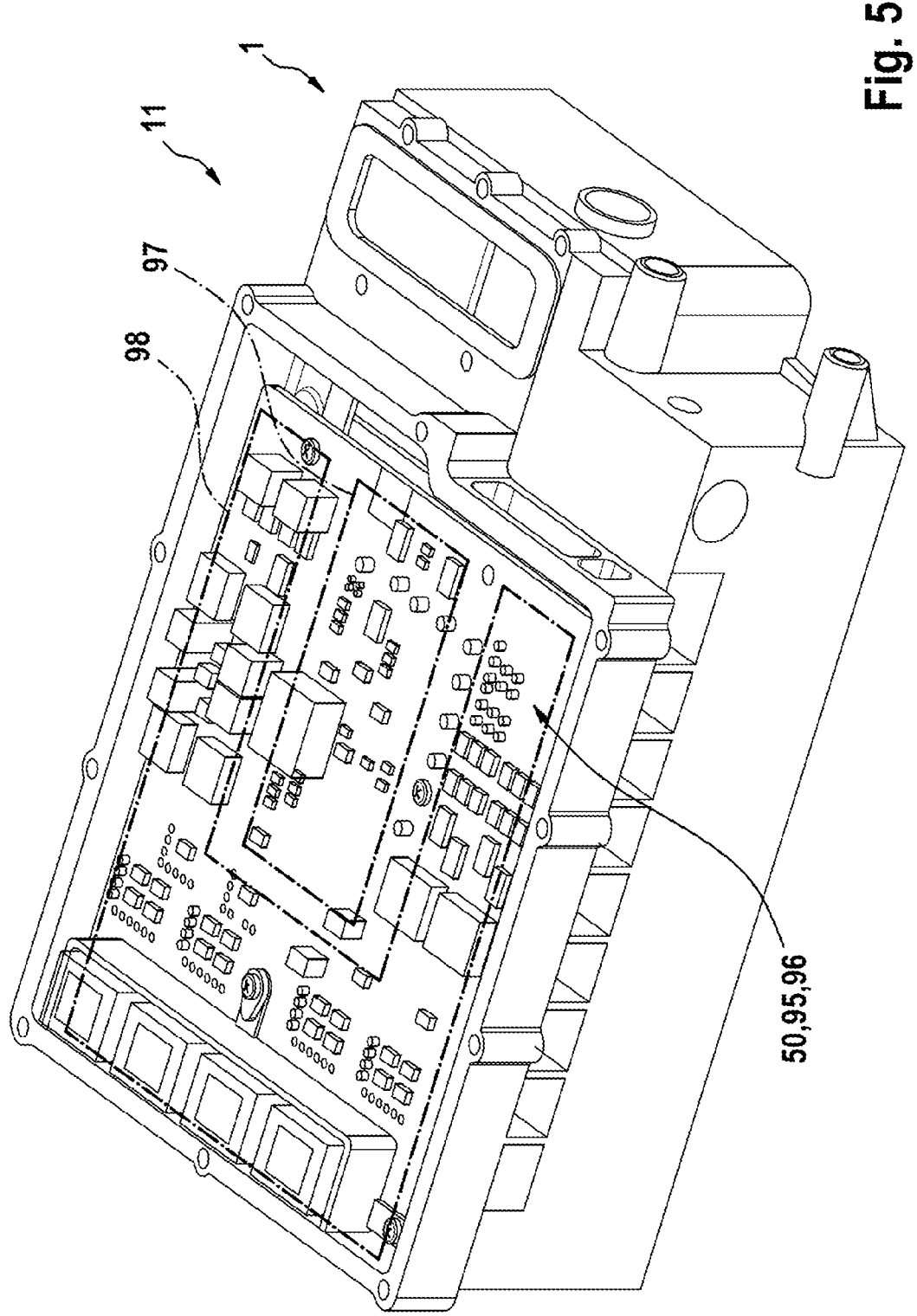
FIG. 5 shows an arrangement of a second element of the battery controller.

FIG. 5 shows an arrangement of a second element 50 of the battery controller.

Here, FIG. 5 first shows the second side 11, opposite the first side 10, of the housing element 1.

Furthermore, a second element 50 of the battery controller is arranged on the housing element 1 in a thermally conductive manner on the second side 11. Here, the second element 50 of the battery controller is, in particular, an electrical voltage converter 95, in particular a DC-DC voltage converter 96.

The second element 50 of the battery controller can be divided, for example, into two regions 97, 98 here.

In this case, a first region 97 contains elements of the second element 50 which do not require intensive temperature control. In particular, a logic part is arranged in the first region 97. In this case, a second region 98 contains elements of the second element 50 which require intensive temperature control. In particular, the power component is arranged in the second region 98 here. The first region 97 is associated with the intermediate element 23 here. In this case, the second region 98 is associated with that region of the flow duct 4 through which temperature-control fluid flows in a U-shaped manner. Accordingly, the second region 98 also has a U-shaped profile.

Overall, the second element 50 of the battery controller can be arranged in a space-saving manner and optimized in respect of temperature control here.

What is claimed is:

1. A housing element of a battery, wherein
the housing element (1) is configured to be connected to another housing element so as to form a common interior space designed for receiving a plurality of battery cells of a battery module,
wherein the housing element (1) forms a temperature-control structure (2) on a first side (10) and a covering element (3) is connected to the housing element (1) in such a way that the covering element (3) delimits a flow duct (4), through which temperature-control fluid can flow, in a fluid-tight manner and the temperature-control structure (2) is configured such that the temperature-control fluid flows around it
wherein the temperature-control structure (2) is configured in such a way that a flow-guiding element (21), which delimits the flow duct (4) for guiding the temperature-control fluid, rises from the first side (10),
wherein a plurality of vortex elements (22), which are arranged in such a way that a turbulent flow of temperature-control fluid flowing in the flow duct (4) is created, rise in the flow duct (4),
wherein the flow-guiding element (21) is configured, with a greater height than respective vortex elements (22) of the plurality of vortex elements (22), so that the covering element (3) is arranged on the flow-guiding element (21) at a minimum distance of 0.5 mm from the plurality of vortex elements (22), and wherein the plurality of vortex elements (22) are circular and have a height (73) of between 11.5 mm and 14.5 mm.

2. The housing element according to claim 1,
wherein the flow-guiding element (21) includes an intermediate element (23) which divides the flow duct (4) into two component ducts (41) which are connected in a flow-guiding manner only at one end (42) of the flow duct (4),
wherein the housing element (1) includes an inlet (51) in a first component duct (410) and an outlet (52) in a second component duct (420).

3. The housing element according to claim 2, wherein the intermediate element (23) has a width of between 8 mm and 12 mm.

4. The housing element according to claim 2, wherein the plurality of vortex elements (24) are fitted on flanks (61) of the intermediate element (23) and/or on flanks (62) of the flow-guiding element (21).

5. The housing element according to claim 2, wherein the plurality of vortex elements (22) are fitted in a pattern which comprises a plurality of rows (71), wherein vortex elements (22) of the plurality of vortex elements (22) of adjacent rows (71) are respectively arranged at a distance of between 8.5 mm and 12.5 mm from one another and/or respectively adjacent of the plurality of rows (71) are arranged symmetrically offset with respect to one another.

6. The housing element according to claim 2, wherein the plurality of vortex elements (22) have a diameter (72) of between 3 mm and 6 mm and/or a draft angle (74) of at least 8 degrees and/or a radius (75) of at least 1.5 mm.

7. The housing element according to claim 1,
wherein an element (50) of a battery controller is arranged in a thermally conductive manner on a second side (11), opposite the first side (10), of the housing element (1).

8. The housing element according to claim 7, wherein the element (50) of the battery controller is an electrical voltage converter (95).

9. The housing element according to claim 8, wherein the element (50) is a DC-DC voltage converter (96).

10. The housing element according to claim 1, wherein the covering element (3) is designed in a planar manner from a metal.

11. The housing element according to claim 1, wherein the covering element (3) has a deformed portion.

12. The housing element according to claim 1, wherein the housing element (1) is designed as a die-cast housing (100).

13. A production method for producing a housing element (1) according to claim 1,
wherein the production method comprises:
a) providing a housing element (1), which forms a temperature-control structure (2) on a first side (10), and
b) connecting a covering element (3) to the housing element (1) in such a way that the covering element (3) delimits a flow duct (4), through which temperature-control fluid can flow, in a fluid-tight manner and the temperature-control structure (2) is designed such that the temperature-control fluid can flow around it.

14. The production method according to claim 13, wherein the temperature-control structure (2) is designed in such a way that a flow-guiding element (21), which delimits the flow duct (4) for guiding the temperature-control fluid, rises from the first side (10), wherein furthermore a large number of vortex elements (22) rise in the flow duct (4), and wherein the flow-guiding element (21) is cohesively connected to the covering element (3) in a fluid-tight manner.

15. A housing element of a battery, wherein
the housing element (1) is configured to be connected to another housing element so as to form a common interior space designed for receiving a plurality of battery cells of a battery module,
wherein the housing element (1) forms a temperature-control structure (2) on a first side (10) and a covering element (3) is connected to the housing element (1) in such a way that the covering element (3) delimits a flow duct (4), through which temperature-control fluid can flow, in a fluid-tight manner and the temperature-control structure (2) is configured such that the temperature-control fluid flows around it,
wherein the housing element (1) further includes a first element (5) of a battery controller arranged on the covering element (3) in a thermally conductive manner.

16. The housing element according to claim 15,
wherein the temperature-control structure (2) is designed in such a way that a flow-guiding element (21), which delimits the flow duct (4) for guiding the temperature-control fluid, rises from the first side (10),
wherein furthermore a large number of vortex elements (22), which are arranged in such a way that a turbulent flow of temperature-control fluid flowing in the flow duct (4) is created, rise in the flow duct (4), and wherein
the flow-guiding element (21) is designed, with a greater height than respective vortex elements (22), so that the covering element (3) can be arranged on the flow-guiding element (21) at a distance from the vortex elements (22).

17. The housing element according to claim 16,
wherein the flow-guiding element (21) includes an intermediate element (23) which divides the flow duct (4) into two component ducts (41) which are connected in a flow-guiding manner only at one end (42) of the flow duct (4),
wherein the housing element (1) includes an inlet (51) in a first component duct (410) and an outlet (52) in a second component duct (420).

18. The housing element according to claim 17, wherein the intermediate element (23) has a width of between 8 mm and 12 mm.

19. The housing element according to claim 17, wherein vortex elements (24) are fitted on flanks (61) of the intermediate element (23) and/or on flanks (62) of the flow-guiding element (21).

20. The housing element according to claim 17, wherein the vortex elements (22) are fitted in a pattern which comprises a plurality of rows (71), wherein vortex elements (22) of adjacent rows (71) are respectively arranged at a distance of between 8.5 mm and 12.5 mm from one another and/or respectively adjacent of the plurality of rows (71) are arranged symmetrically offset with respect to one another.

* * * * *